United States Patent
van den Berg et al.

(10) Patent No.: US 6,276,297 B1
(45) Date of Patent: Aug. 21, 2001

(54) METHOD OF AND A DEVICE FOR DISINFECTING A MILKING MACHINE AND/OR A CLEANING DEVICE FOR THE TEATS OF AN ANIMAL

(75) Inventors: Karel van den Berg, Bleskensgraaf; Martijn Otten, Delft, both of (NL)

(73) Assignee: Maasland N.V. (NL)

( * ) Notice: Subject to any disclaimer, the term of this patent is extended or adjusted under 35 U.S.C. 154(b) by 0 days.

(21) Appl. No.: 09/522,781

(22) Filed: Mar. 6, 2000

Related U.S. Application Data

(63) Continuation of application No. PCT/NL99/00412, filed on Jul. 1, 1999.

(30) Foreign Application Priority Data

Jul. 6, 1998 (NL) .................................................. 1009561
Jul. 15, 1998 (NL) .................................................. 1009663

(51) Int. Cl.$^7$ .................................. A01J 3/00; A01J 5/00
(52) U.S. Cl. ................................... 119/14.01; 119/14.08; 119/14.14; 119/14.18
(58) Field of Search ............................ 119/14.01, 14.02, 119/14.08, 14.14, 14.18, 14.47

(56) References Cited

U.S. PATENT DOCUMENTS

| | | | |
|---|---|---|---|
| Re. 36,391 | * 11/1999 | Berg et al. | 119/14.18 |
| 4,034,713 | * 7/1977 | Umbraugh | 119/14.02 |
| 5,474,023 | * 12/1995 | Khondabandehloo et al. | 119/14.14 |
| 6,055,930 | * 5/2000 | Stein et al. | 119/14.08 |
| 6,118,118 | * 9/2000 | van der Lely et al. | 119/14.08 |
| 6,167,839 | * 1/2001 | Isaksson et al. | 119/14.08 |

* cited by examiner

*Primary Examiner*—Charles T. Jordan
*Assistant Examiner*—Elizabeth Shaw
(74) *Attorney, Agent, or Firm*—Penrose Lucas Albright

(57) ABSTRACT

In a fully automated milking system, a disinfecting device that disinfects those parts of the milking equipment and of a cleaning device which contact the teats and also usually the udder of an animal to be milked. The disinfecting device comprises an ultraviolet light source wherein the wavelength of the ultraviolet rays are between 100 and 280 nanometers. The light source may be movable within a teat cup or directly connected to the teat cup so that the radiation penetrated the teat cup's liner which is translucent and destroys harmful bacteria on the teat cup parts that contact the teat of an animal being milked as well as contacting portions of the animal's udder.

25 Claims, 1 Drawing Sheet

METHOD OF AND A DEVICE FOR DISINFECTING A MILKING MACHINE AND/OR A CLEANING DEVICE FOR THE TEATS OF AN ANIMAL

RELATED APPLICATION

This Application is a Continuation of International Application PCT/NL99/00412, filed Jul. 1, 1999, International Publication No. WO 00/01224 dated Jan. 13, 2000.

FIELD OF INVENTION

The invention relates to a method of disinfecting parts of a milking machine, and parts of a cleaning device that clean the udder and the teats of an animal to be milked which come into contact with the udder and the teats of an animal.

BACKGROUND OF THE INVENTION

Such a method as broadly described above is known.

In such a method a cleaning or disinfecting fluid or a fluid for both purposes is usually applied. Such a method has the disadvantages of being rather time-consuming and failure to eliminate all the undesired micro-organisms.

The invention aims at providing a method and a device which does not have the above-mentioned drawbacks or at least they are minimized.

SUMMARY OF THE INVENTION

In accordance with the invention the above object of the invention is achieved by means of a method in which the above-mentioned parts are disinfected with the aid of a light source. According to an inventive feature, the light source transmits ultraviolet rays. According to another invention feature, the rays have a wavelength ranging between 100 and 280 nanometers.

Light having such a wavelength, also called UVC-light, appears to be particularly effective for eliminating undesired bacteria, such as the common E-coli bacterium. In this manner a so-called cross-infection between the animals, caused by the fact that the various parts of the milking machine or the cleaning device or both come into contact with the teats or udders or both of various animals, is prevented.

From the Russian patent 1159521, it is known per se to apply a UV-lamp in a milk tank for the purpose of killing the bacteria present therein.

According to an inventive feature, for disinfecting various parts of the milking machine or the cleaning device, or both, the light source and the parts to be disinfected are moved relative to each other. In this manner most if not all of the milking machine or the cleaning device or both, can be disinfected by means of one light source. According to an inventive feature, for the purpose of automating this relative movement, the parts to be disinfected are moved relative to each other by means of one or more operating members, such as a robot arm.

In accordance with an inventive feature, before an animal comes into contact with certain parts of the milking machine or the cleaning device or with both, the relevant parts are disinfected by means of the light source.

For obtaining a still better disinfection of the relevant parts, said parts are cleaned by means of cleaning fluid before being disinfected or after having been disinfected by means of the light source or both before and after.

The invention further relates to an apparatus for milking or cleaning or doing both whereby it contacts the udder or the teats or both of animals, comprising a milking machine or a cleaning device for cleaning the udder or the teats or both of an animal being provided with at least one teat cup and at least one disinfecting device provided with at least one light source transmitting ultraviolet rays and in which disinfecting device one or more of the above-described methods can be applied. According to an inventive feature, the ultraviolet rays have a wavelength ranging 100 and 280 nanometers.

In accordance with an inventive feature, the disinfecting device is fitted to the milking machine. According to another inventive feature, the disinfecting device is disposed on a robot arm which can be controlled automatically. In again another embodiment of the invention the light source is disposed on a flexible, controllable arm, such as an endoscope.

According to another inventive feature, the light source may also be disposed in the teat cup. In yet another embodiment of the invention the light source is disposed in the pulsation space. In a simple embodiment of the invention, according to an inventive feature, at least part of the liner is composed of a transparent material through which UV-rays may pass. For the purpose of avoiding in particular cross infection, the light source is arranged or disposed in the teat cup in such a manner that at least the upper part of the liner that comes into contact with the teat and usually the udder also is exposed to rays from the ultraviolet light source.

In accordance with an inventive feature, the disinfecting device comprises a tubular light source or a light source fitted to an end of a rod or pin-shaped element. The tubular light source or the rod or pin-shaped element can be inserted in a simple manner into the teat cup or be passed through the milk line. In another embodiment of the invention, the light source is transmitted via an optical cable, such as a glass fiber cable.

The invention also relates to a teat cup and a cleaning device provided with a disinfecting device as described above which is suitable for being applied in a method or a device as described above.

BRIEF DESCRIPTION OF THE DRAWINGS

The invention will now be explained in further detail with reference to the accompanying drawings.

DETAILED DESCRIPTION OF THE PREFERRED EMBODIMENTS

Figure 1:
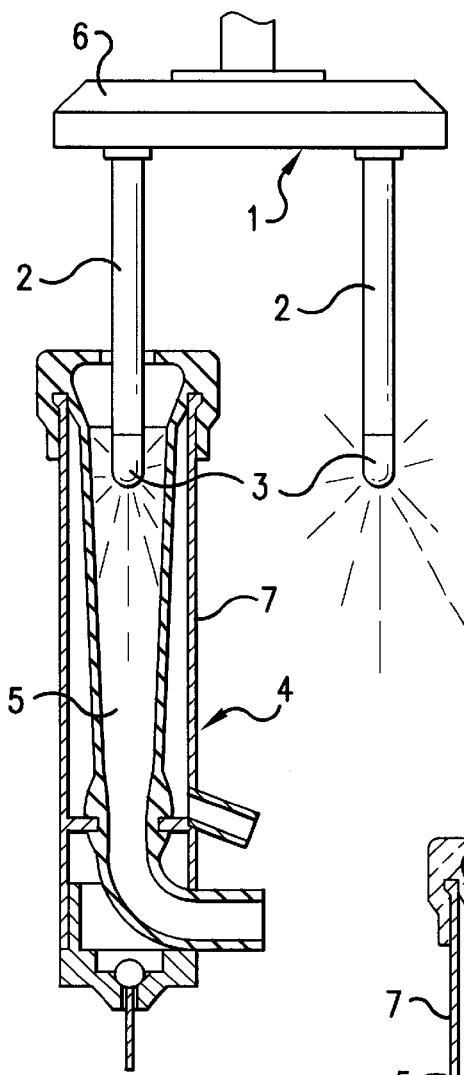
FIG. 1 shows a cross-sectional view of a first embodiment of a UVC-light source which is designed as a rod or pin-shaped element.

FIG. 1 shows a first embodiment in which the disinfecting device 1 is a rod or pin-shaped element 2, the lower end of which is provided with a UVC-light source 3.

FIG. 1 also depicts a cross-section of a teat cup 4 provided with a liner 5. The disinfecting device 1 comprises a carrier 6 on which, in the present embodiment, there are disposed four rod or pin-shaped elements 2 each provided with a UVC-light source 3, the arrangement being such that four teat cups can be disinfected simultaneously. The UVC-light sources 3 are connected to an appropriate energy source. The length and diameter of elements 2 are selected in such a manner that each element 2 can be introduced into each teat cup 4 at least along the greater part of its liner 5. The relative velocity of the movement between teat cups 4 and elements 2 is selected so that each part of liner 5 is exposed sufficiently long to the UVC-radiation from light source 3, whereby an optimal disinfection is obtained. In the present embodiment both disinfecting device 1 and teat cup 4 can be moved relative to each other by means of a robot arm during disinfecting.

Figure 2:
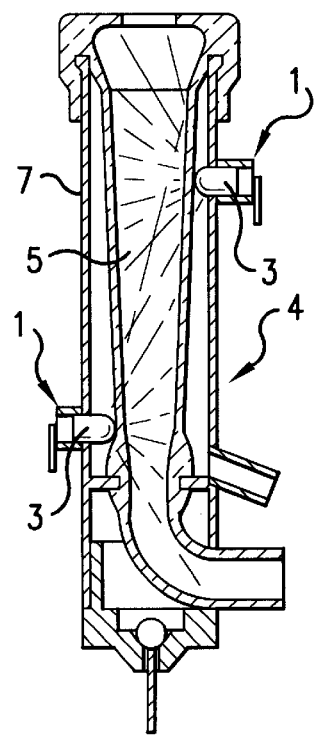
FIG. 2 shows a cross-sectional view of a teat cup with the disinfecting device according to the invention included therein.

FIG. 2 shows a second embodiment in which parts corresponding to those of the first embodiment are indicated by the same reference numerals. In the embodiment shown in FIG. 2 disinfecting device 1 is included in teat cup 4. Disinfecting device 1 thus comprises two UVC-light sources 3. The first light source 3 is disposed in outer wall 7 of teat cup 4 near the upper side thereof, whereas the second light source 3 is disposed in outer wall 7 of teat cup 4 near the lower side thereof. In order to obtain a proper disinfection of liner 5 the latter is composed of transparent material in the present embodiment. However, it will be obvious, in consideration of the present invention, that it is also possible to arrange UVC-light sources 3 in liner 5 so that they can also irradiate into the interior of liner 5.

Figure 3:
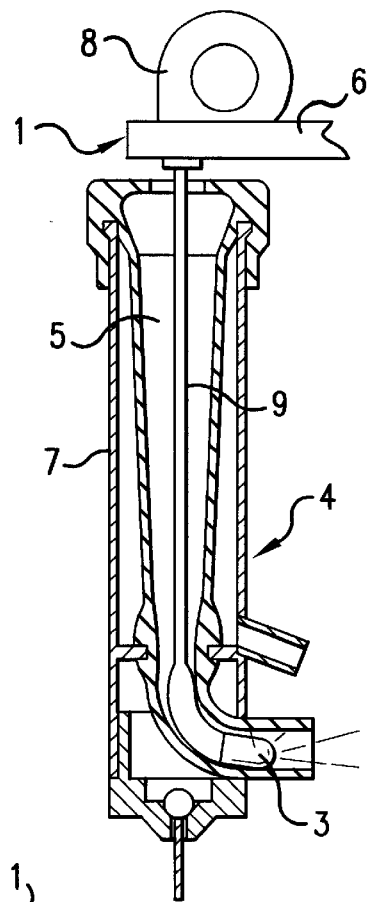
FIG. 3 is a cross-sectional view of a teat cup with a disinfecting device designed as an endoscope including therein.

FIG. 3 shows a third embodiment of disinfecting device 1 according to the invention, in which embodiment parts corresponding to those of the previous embodiments are again indicated by the same reference numerals. In the third embodiment of the invention disinfecting device 1 comprises an endoscope. Disinfecting device 1 thus comprises a reel 8 around which a cable 9 is wound, which cable 9 is provided at its outer end with a UVC-light source 3. Cable 9 can be wound and unwound automatically, the arrangement being such that UVC-light source 3 is passed through teat cup 4 and through the milk line system or other parts of the milking machine that come into contact with milk.

Although we have disclosed the preferred embodiments of our invention, it is to be understood that it is capable of other adaptations and modifications within the scope of the following claims:

What is claimed is:

1. A method of disinfecting parts of milking equipment which contact the teats and udder of the animal to be milked which comprises irradiating said parts with an electromagnetic radiation of a type that destroys harmful bacteria for a sufficient period of time substantially to destroy all of said bacteria on said parts.

2. A method in accordance with claim 1, wherein said electromagnetic radiation consists essentially of ultraviolet rays.

3. A method in accordance with claim 2, wherein said electromagnetic rays have a wavelength ranging between 100 and 280 nanometers.

4. A method in accordance with claim 1, comprising moving a source that is irradiating said electromagnetic radiation relative to said parts at a relative velocity not greater than that required for substantially destroying harmful bacteria on said parts by means of said electromagnetic radiation received on said parts.

5. A method in accordance with claim 4, wherein a robot arm moves said source.

6. A method in accordance with claim 1, wherein said step of irradiating said parts with electromagnetic radiation is taken before any of said parts contact an animal being milked by said milking equipment.

7. A method in accordance with claim 1, which comprises the antecedent step of cleaning said parts by cleaning fluid.

8. A method in accordance with claim 1, which comprises the subsequent step of cleaning said parts with a cleaning fluid.

9. An apparatus to be used in the process of milking animals, the apparatus comprising a disinfecting device which includes a light source transmitting ultraviolet rays and supporting means for said light source, said supporting means constructed and arranged to position said light source so that its ultraviolet rays destroy harmful bacteria on parts of said apparatus that come into contact with said animal that is milked by the apparatus.

10. An apparatus in accordance with claim 9, wherein said rays have a wavelength ranging between 100 and 280 nanometers.

11. An apparatus in accordance with claim 9, comprising a milking machine, said disinfecting device being fitted to said milking machine.

12. An apparatus in accordance with claim 9, comprising an automatically controlled robot arm, said disinfecting device being disposed on said robot arm.

13. An apparatus in accordance with claim 9, which comprises a flexible, controllable arm, said light source being mounted on said arm.

14. An apparatus in accordance with claim 9, wherein said light source comprises a cable.

15. An apparatus in accordance with claim 9, wherein said light source comprises an optical fiber.

16. An apparatus in accordance with claim 9, wherein said light source comprises an endoscope.

17. An apparatus in accordance with claim 9, which comprises a teat cup, said light source being disposed in said teat cup.

18. An apparatus in accordance with claim 17, wherein said teat cup comprises a pulsation space, said light source being disposed in said pulsation space.

19. An apparatus in accordance with claim 18, wherein said teat cup comprises a liner which is composed of a material which is transparent to ultraviolet rays.

20. An apparatus in accordance with claim 17, wherein said light source is arranged in the upper part of a liner in said teat cup that comes into contact with the teat of the animal being milked.

21. An apparatus in accordance with claim 9, wherein said light source comprises a tubular light source.

22. An apparatus in accordance with claim 9, wherein said light source comprises a rod.

23. An apparatus in accordance with claim 9, wherein said light source comprises an optical cable.

24. An apparatus in accordance with claim 23, wherein said optical cable comprises optical fibers.

25. In a fully automated milking apparatus which includes teat cups that are automatically connected and disconnected from the teats of the animal being milked, a disinfecting device which comprises a source of electromagnetic ultraviolet radiation which is constructed and arranged in said teat cup so that it destroys harmful bacteria on parts of said teat cup which contact the animal to be milked whereby said animal-contacting parts of said teat cup are disinfected by ultraviolet radiation before the teat cups are received on the animal to be milked.

* * * * *